United States Patent
Butler

(10) Patent No.: US 11,051,491 B1
(45) Date of Patent: Jul. 6, 2021

(54) PORTABLE PET WATER DISPENSING SYSTEM

(71) Applicant: Stephanie Butler, Lithonia, GA (US)

(72) Inventor: Stephanie Butler, Lithonia, GA (US)

(*) Notice: Subject to any disclaimer, the term of this patent is extended or adjusted under 35 U.S.C. 154(b) by 281 days.

(21) Appl. No.: 16/292,452

(22) Filed: Mar. 5, 2019

(51) Int. Cl.
*A01K 7/00* (2006.01)
*B60N 3/18* (2006.01)

(52) U.S. Cl.
CPC . *A01K 7/00* (2013.01); *B60N 3/18* (2013.01)

(58) Field of Classification Search
CPC . A01K 7/00; A01K 7/02; A01K 7/022; A01K 7/025; A01K 7/027; A01K 7/04; A01K 7/06; B60N 3/18; B60N 3/10; B60N 3/102–3/104; B60N 3/106–3/108
USPC ........................................................ 119/72.5
See application file for complete search history.

(56) References Cited

U.S. PATENT DOCUMENTS

| | | | | |
|---|---|---|---|---|
| 2,558,181 | A * | 6/1951 | Kassel | F25D 3/14 62/166 |
| 2,645,392 | A * | 7/1953 | Gottsegen | A45C 11/20 224/484 |
| 4,120,426 | A | 10/1978 | Grubbs | |
| 4,420,097 | A * | 12/1983 | Motsenbocker | A45F 3/16 222/131 |
| 5,282,557 | A * | 2/1994 | McCook | A45F 3/16 222/175 |
| 5,465,885 | A * | 11/1995 | Wyatt | A45F 3/04 222/175 |
| 6,216,926 | B1 * | 4/2001 | Pratt | A45F 3/04 224/148.2 |
| 6,513,686 | B1 | 2/2003 | Ben-Sasson | |
| 6,966,464 | B2 * | 11/2005 | Betkowski | A47C 1/16 222/192 |
| 7,175,059 | B2 * | 2/2007 | Copich | A45F 3/20 224/148.2 |
| 7,527,017 | B1 | 5/2009 | Cribb | |
| D741,025 | S | 10/2015 | Ross | |
| 9,615,540 | B1 * | 4/2017 | Mansour | A01K 5/0135 |
| 9,907,372 | B2 * | 3/2018 | Dotey | A45C 3/02 |
| 10,028,484 | B2 | 7/2018 | Ross | |
| 2006/0011142 | A1 * | 1/2006 | Walter | A01K 39/0213 119/72.5 |
| 2009/0039128 | A1 * | 2/2009 | Damico | B60R 9/00 224/572 |

(Continued)

FOREIGN PATENT DOCUMENTS

GB 2340722 4/2003

*Primary Examiner* — Ebony E Evans
(74) *Attorney, Agent, or Firm* — Kyle A. Fletcher, Esq.

(57) ABSTRACT

The portable pet water dispensing system is configured for use with a companion animal. The portable pet water dispensing system is configured for use in a vehicle. The vehicle further comprises a passenger seat. An example of a suitable vehicle includes, but is not limited to an automobile. The portable pet water dispensing system is a watering device. The portable pet water dispensing system provides a source of water for the companion animal as the companion animal is traveling in the vehicle. The companion animal controls when the water is dispensed. The portable pet water dispensing system table comprises a harness, a housing, and a sipper water structure. The harness attaches the housing to the passenger seat. The housing contains the sipper water structure. The sipper water structure dispenses the water to the companion animal.

18 Claims, 5 Drawing Sheets

(56) References Cited

U.S. PATENT DOCUMENTS

2013/0298838 A1* 11/2013 Belmonte .............. A01K 7/00
   119/72
2017/0181400 A1   6/2017 Hoffman

* cited by examiner

PORTABLE PET WATER DISPENSING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and animal husbandry including watering equipment for livestock, more specifically, valve controlled automatic watering device actuated by an animal. (A01K7/06)

SUMMARY OF INVENTION

The portable pet water dispensing system is configured for use with a companion animal. The portable pet water dispensing system is configured for use in a vehicle. The vehicle further comprises a passenger seat. An example of a suitable vehicle includes, but is not limited to an automobile. The portable pet water dispensing system is a watering device. The portable pet water dispensing system provides a source of water for the companion animal as the companion animal is traveling in the vehicle. The companion animal controls when the water is dispensed. The portable pet water dispensing system table comprises a harness, a housing, and a sipper water structure. The harness attaches the housing to the passenger seat. The housing contains the sipper water structure. The sipper water structure dispenses the water to the companion animal.

These together with additional objects, features and advantages of the portable pet water dispensing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable pet water dispensing system in detail, it is to be understood that the portable pet water dispensing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable pet water dispensing system.

It is therefore important that the claims be regarded as including such equivalent construction insofar as they do not depart from the spirit and scope of the portable pet water dispensing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
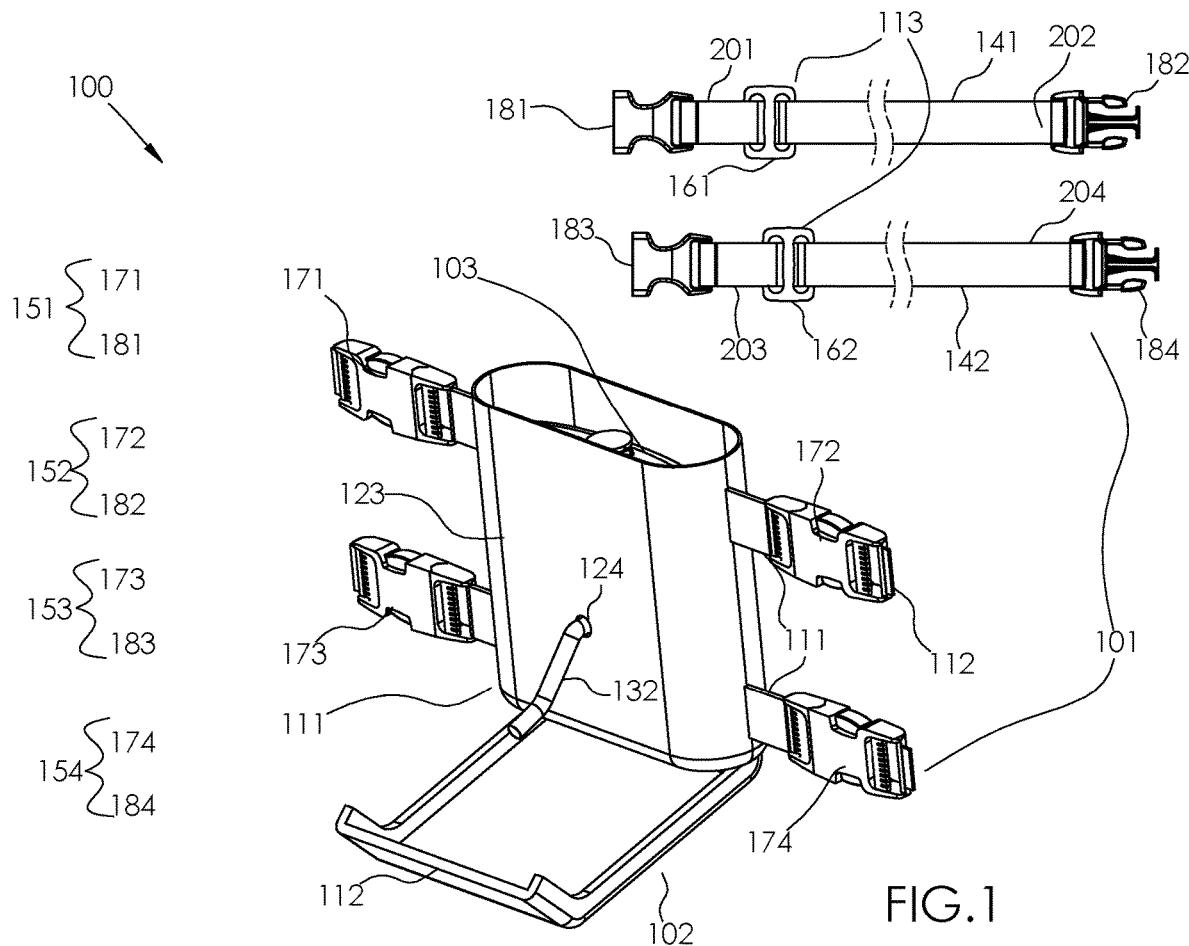
FIG. 1 is a perspective view of an embodiment of the disclosure.
Figure 2:
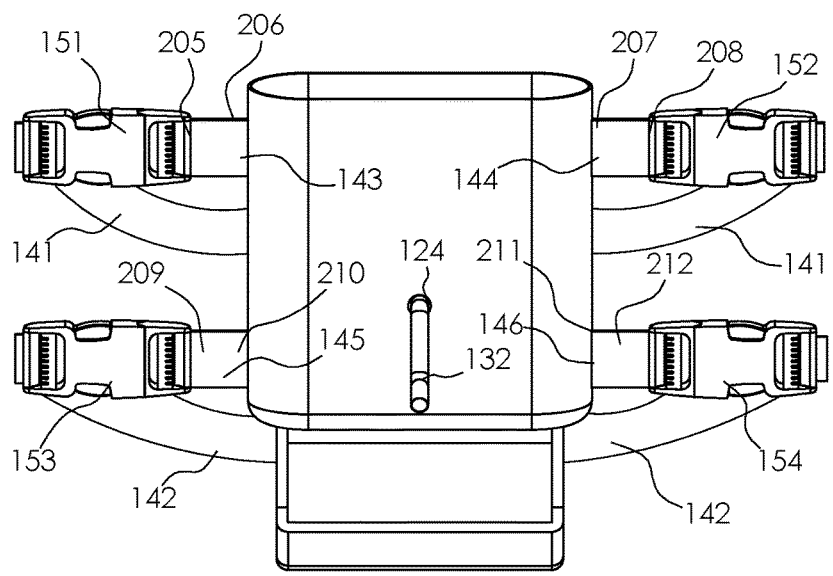
FIG. 2 is a front view of an embodiment of the disclosure.
Figure 3:
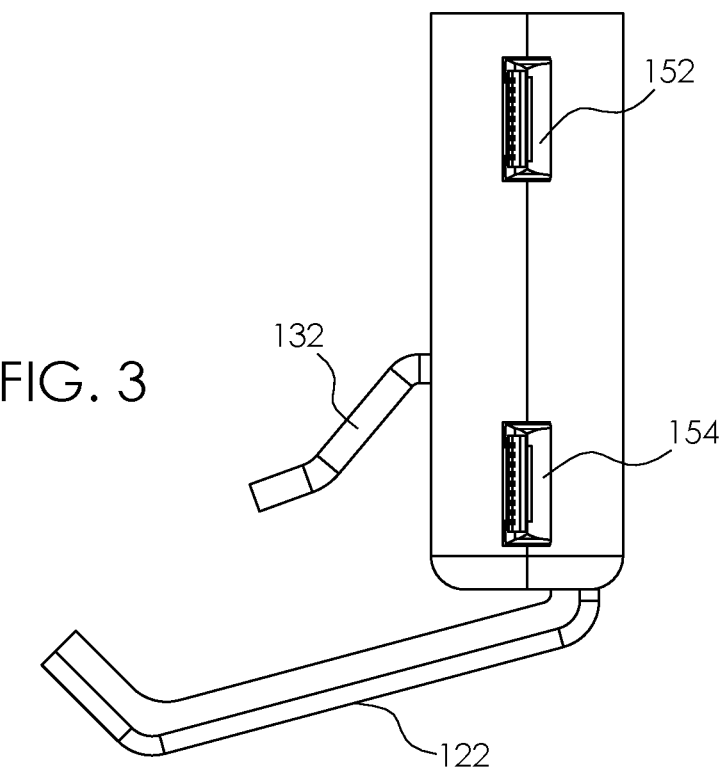
FIG. 3 is a side view of an embodiment of the disclosure.
Figure 4:
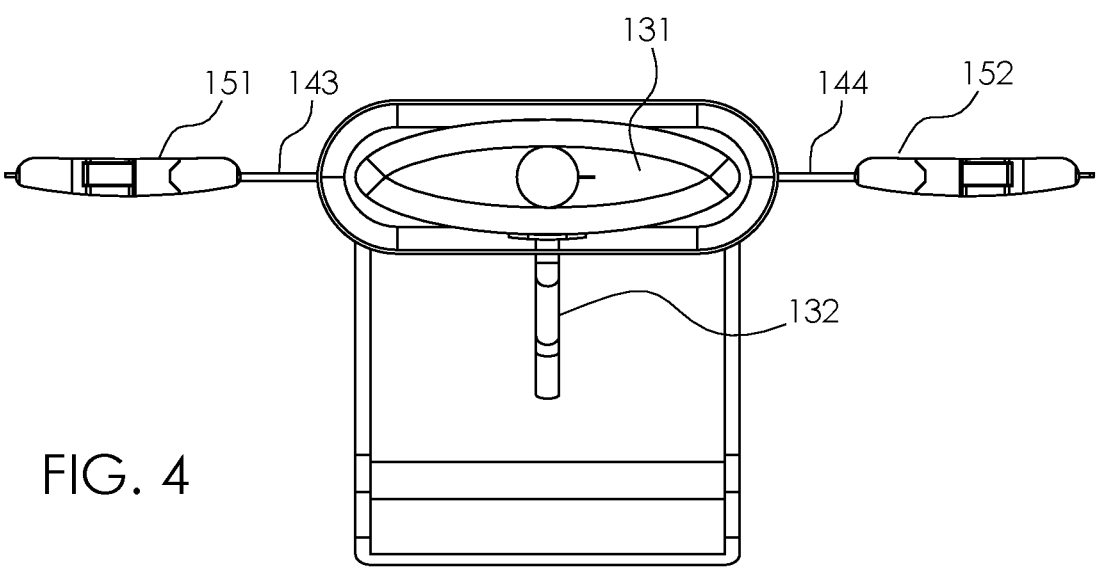
FIG. 4 is a top view of an embodiment of the disclosure.
Figure 5:
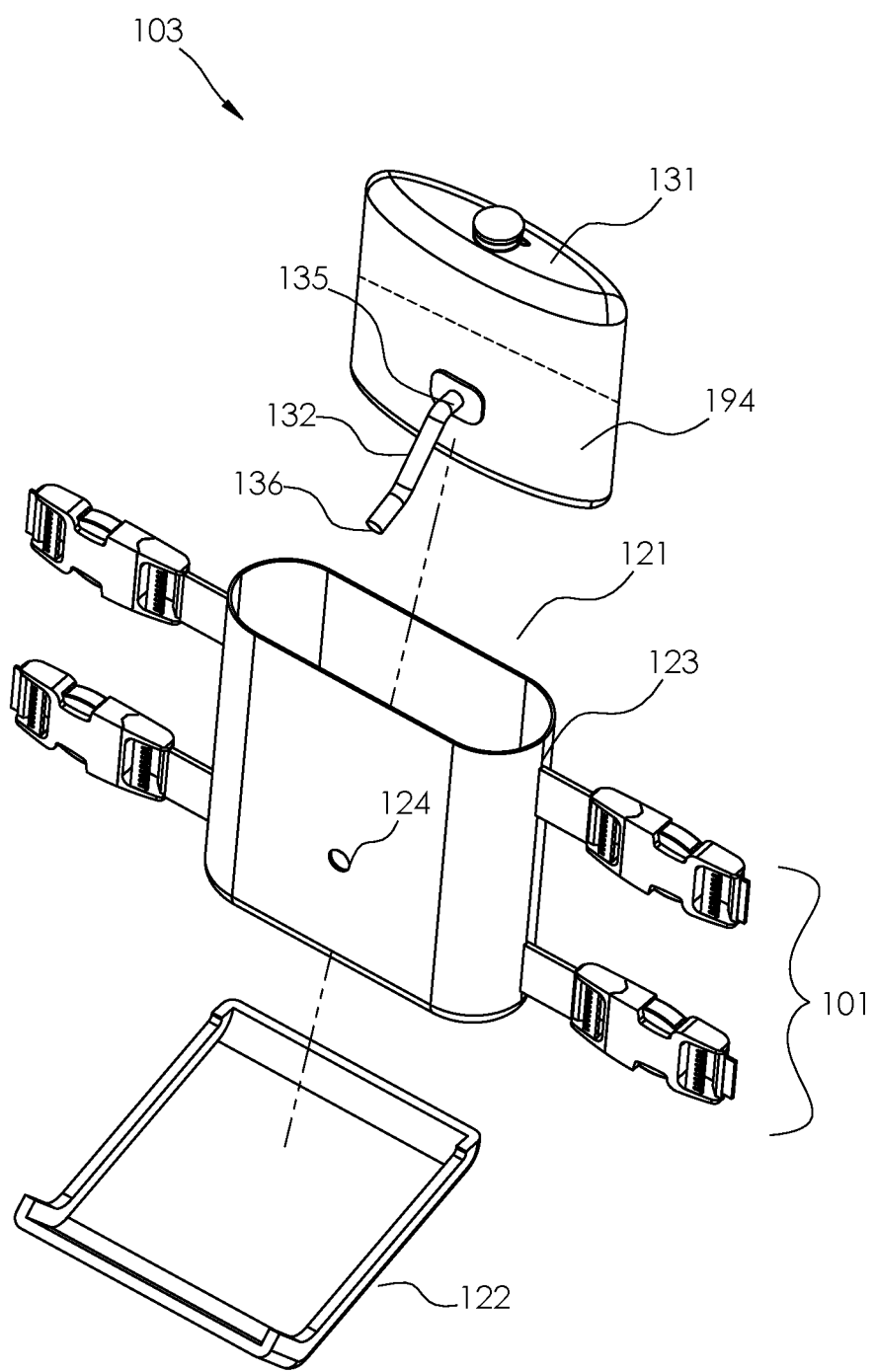
FIG. 5 is an exploded view of an embodiment of the disclosure.
Figure 6:
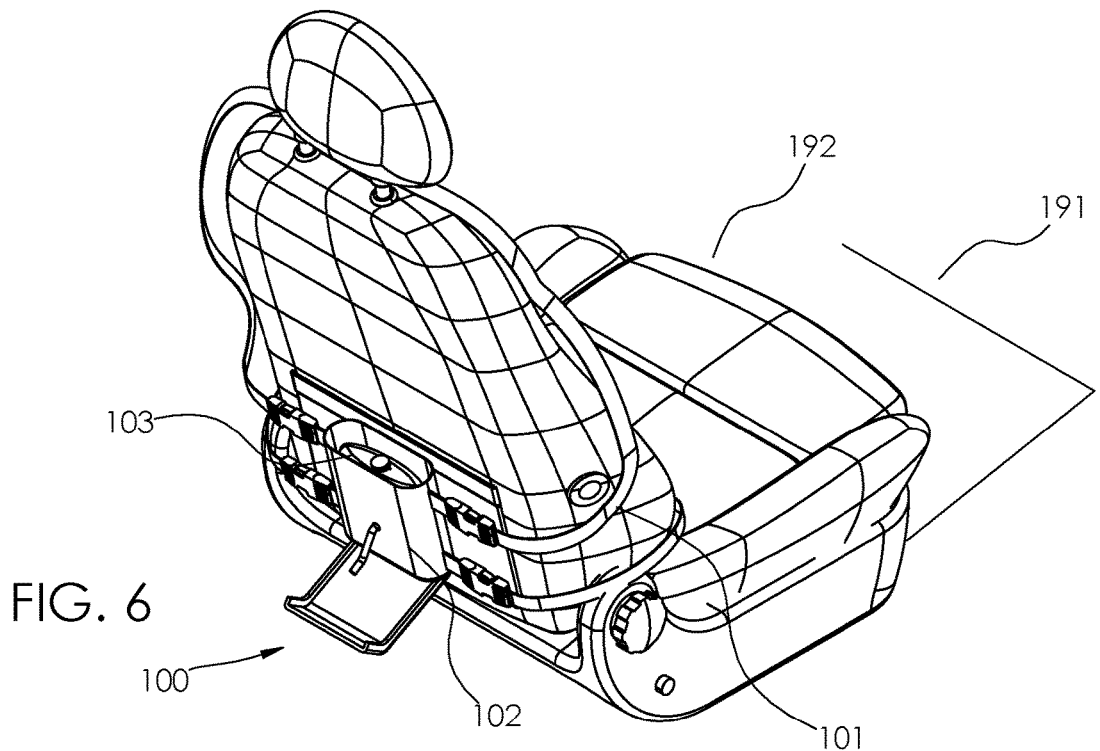
FIG. 6 is an in-use view of an embodiment of the disclosure.
Figure 7:
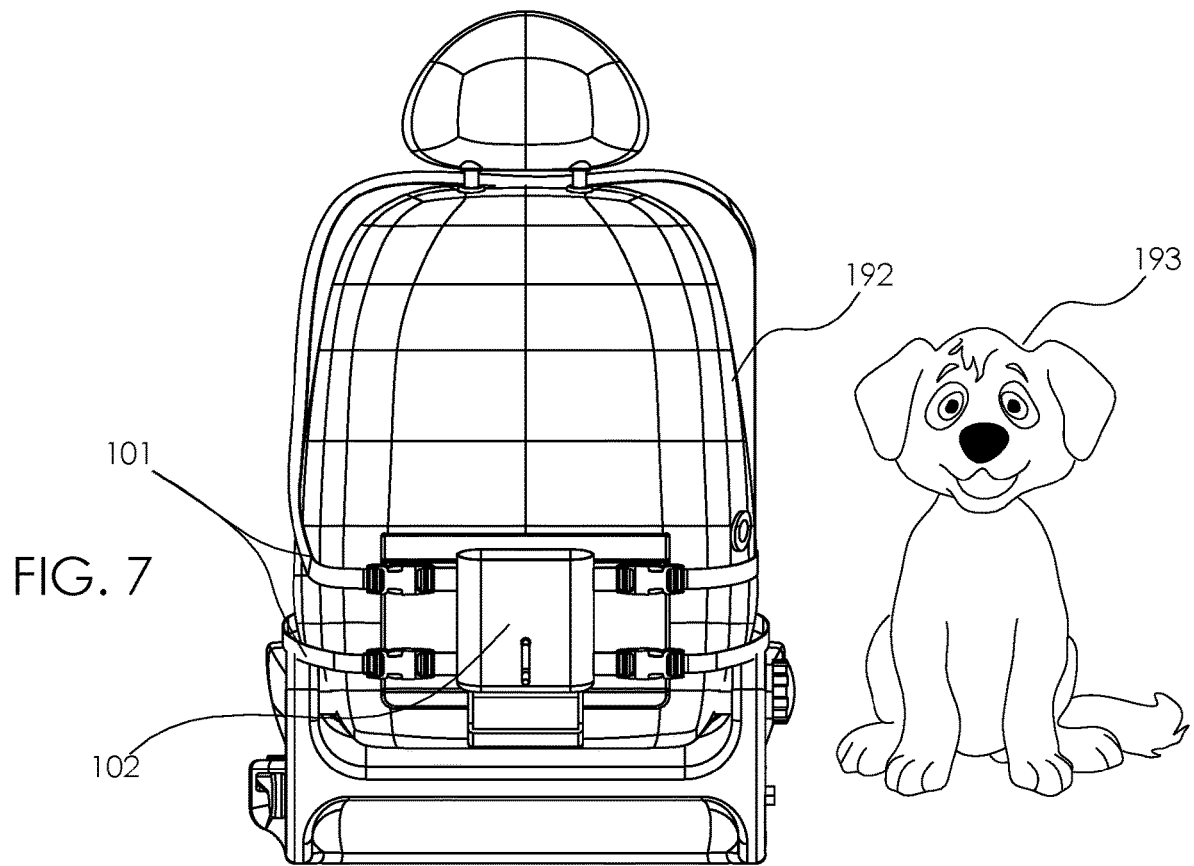
FIG. 7 is an in-use view of an embodiment of the disclosure.
Figure 8:
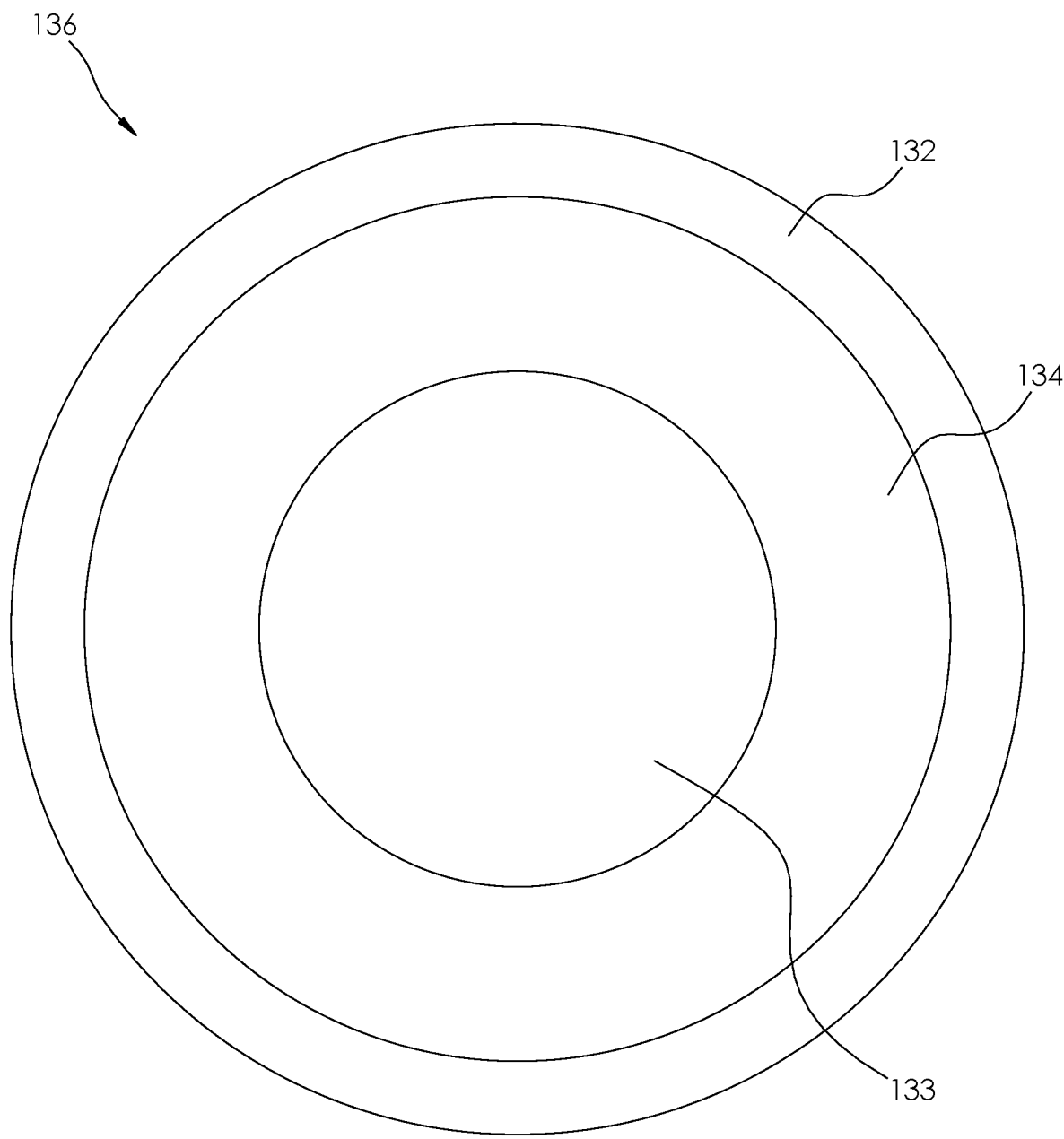
FIG. 8 is a detail view of an embodiment of the disclosure.

Detailed reference will now be made to one or more potential embodiments of the disclosure, which are illustrated in FIGS. 1 through 8.

The portable pet water dispensing system 100 (hereinafter invention) is configured for use with a companion animal 193. The invention 100 is configured for use in a vehicle 191. The vehicle 191 further comprises a passenger seat 192. An example of a suitable vehicle 191 includes, but is not limited to an automobile. The invention 100 is a watering device. The invention 100 provides a source of water 194 for the companion animal 193 as the companion animal 193 is traveling in the vehicle 191. The companion animal 193 controls when the water 194 is dispensed. The invention 100 table comprises a harness 101, a housing 102, and a sipper water 194 structure 103. The harness 101 attaches the housing 102 to the passenger seat 192. The housing 102 contains the sipper water 194 structure 103. The sipper water 194 structure 103 dispenses the water 194 to the companion animal 193.

The vehicle 191 is defined in greater detail elsewhere in this disclosure. The passenger seat 192 refers to a seat that is installed within the vehicle 191. The companion animal 193 is defined in greater detail elsewhere in this disclosure.

The water 194 (CAS 7732-18-5) is a molecular structure of oxygen and hydrogen that is a liquid a normal temperature and pressure. Water 194 is commonly found within a biological structure. Within this disclosure, the term water 194 is intended to refer to pure water 194 or a water 194 based solution. Those skilled in the arts will recognize that water 194 and water 194 based solutions can be exchanged within the invention 100 without undue experimentation.

The harness 101 is a textile-based apparatus. The harness 101 attaches the housing 102 to the passenger seat 192 of the vehicle 191. The harness 101 is an adjustable structure such that the harness 101 accommodates variations in the form factor of the passenger seat 192 of the vehicle 191. The use of a harness 101 is well-known and documented in the textile, apparel and sporting arts. The harness 101 comprises a plurality of straps 111, a plurality of buckles 112, and a plurality of ring and slider arrangements 113.

Each of the plurality of straps 111 is a textile webbing. Each of the plurality of straps 111 performs a function selected from the group consisting of: a) attaching two straps selected from the plurality of straps 111 together; and, b) attaching a strap selected from the plurality of straps 111 to the housing 102. The plurality of straps 111 comprises a first strap 141, a second strap 142, a third strap 143, a fourth strap 144, a fifth strap 145, and a sixth strap 146.

The first strap 141 is further defined with a first end 201 and a second end 202. The second strap 142 is further defined with a third end 203 and a fourth end 204. The third strap 143 is further defined with a fifth end 205 and a sixth end 206. The fourth strap 144 is further defined with a seventh end 207 and an eighth end 208. The fifth strap 145 is further defined with a ninth end 209 and a tenth end 210. The sixth strap 146 is further defined with an eleventh end 211 and a twelfth end 212.

The first strap 141 is a textile webbing structure that attaches the third strap 143 to the fourth strap 144. The second strap 142 is a textile webbing structure that attaches the fifth strap 145 to the sixth strap 146. The third strap 143 is a textile webbing structure that attaches the first strap 141 to the sleeve 121. The fourth strap 144 is a textile webbing structure that attaches the first strap 141 to the sleeve 121. The fifth strap 145 is a textile webbing structure that attaches the second strap 142 to the sleeve 121. The sixth strap 146 is a textile webbing structure that attaches the second strap 142 to the sleeve 121.

Each of the plurality of buckles 112 is a quick release buckle. Each of the plurality of buckles 112 attaches two straps selected from the plurality of straps 111 together. The buckle and the quick release buckle are defined in greater detail elsewhere in this disclosure. The plurality of buckles 112 comprises a first quick release buckle 151, a second quick release buckle 152, a third quick release buckle 153, and a fourth quick release buckle 154.

The first quick release buckle 151 is the quick release buckle that attaches the first strap 141 to the third strap 143. The first quick release buckle 151 comprises a first female component 171 and a first male component 181. The first male component 181 inserts into the first female component 171. The first female component 171 is the female component of the first quick release buckle 151. The first male component 181 is the male component of the first quick release buckle 151.

The second quick release buckle 152 is the quick release buckle that attaches the first strap 141 to the fourth strap 144. The second quick release buckle 152 comprises a second female component 172 and a second male component 182. The second male component 182 inserts into the second female component 172. The second female component 172 is the female component of the second quick release buckle 152. The second male component 182 is the male component of the second quick release buckle 152.

The third quick release buckle 153 is the quick release buckle that attaches the second strap 142 to the fifth strap 145. The third quick release buckle 153 comprises a third female component 173 and a third male component 183. The third male component 183 inserts into the third female component 173. The third female component 173 is the female component of the third quick release buckle 153. The third male component 183 is the male component of the third quick release buckle 153.

The fourth quick release buckle 154 is the quick release buckle that attaches the second strap 142 to the sixth strap 146. The fourth quick release buckle 154 comprises a fourth female component 174 and a fourth male component 184. The fourth male component 184 inserts into the fourth female component 174. The fourth female component 174 is the female component of the fourth quick release buckle 154. The fourth male component 184 is the male component of the fourth quick release buckle 154.

Each of the plurality of ring and slider arrangements 113 is associated with a strap selected from the plurality of straps 111. Each of the plurality of ring and slider arrangements 113 attaches to the associated strap such that the selected ring and slider arrangement adjusts the span of the length of the selected strap. The use of a ring and slider arrangement is well-known in the textile, apparel, and sporting arts. The ring and slider arrangement is defined in greater detail elsewhere in this disclosure. The plurality of ring and slider arrangements 113 comprises a first ring and slider arrangement 161 and a second ring and slider arrangement 162.

The first ring and slider arrangement 161 is a ring and slider arrangement used to tighten the first strap 141 to the passenger seat 192 of the vehicle 191. The second ring and slider arrangement 162 is a ring and slider arrangement used to tighten the second strap 142 to the passenger seat 192 of the vehicle 191.

The housing 102 is a casing. The housing 102 contains the sipper water 194 structure 103. The housing 102 is formed with all apertures and form factors necessary to allow the housing 102 to accommodate the use and operation of the invention 100. Methods to form a housing 102 suitable for the purposes described in this disclosure are well-known and documented in the mechanical arts. The housing 102 comprises a sleeve 121 and a tray 122.

The sleeve 121 contains the sipper water 194 structure 103. The sleeve 121 is formed with all apertures and form factors necessary to allow the sleeve 121 to accommodate the use and operation of the invention 100. The sleeve 121 is a prism-shaped structure. The sleeve 121 has a pan structure. The sleeve 121 is sized to receive and store the sipper water 194 structure 103. Methods to form a sleeve 121 suitable for the purposes described in this disclosure are well-known and documented in the mechanical arts.

The sleeve 121 further comprises a prism structure 123 and a tube aperture 124. The prism structure 123 is the hollow prism-shaped container that forms the pan structure of the sleeve 121. The prism structure 123 is sized to receive and store the sipper water 194 structure 103. The prism structure 123 forms the exterior surface of the sleeve 121. The tube aperture 124 is an aperture that is formed through the sleeve 121. The tube aperture 124 is sized to receive the straw 132 of the sipper water 194 structure 103 such that the straw 132 is accessible to the companion animal 193.

The sipper water 194 structure 103 is a watering device. The sipper water 194 structure 103 is configured to supply water 194 to the companion animal 193 while the sipper water 194 structure 103 is contained within the housing 102 and attached to the passenger seat 192 of the vehicle 191.

The sipper water 194 structure 103 is configured such that the companion animal dispenses the water 194 for itself. The companion animal 193 drinks the water 194 directly from the sipper water 194 structure 103. The sipper water 194 structure 103 is a well-known and documented device. The sipper water 194 structure 103 is defined and described in greater detail elsewhere in this disclosure. The sipper water 194 structure 103 comprises a bladder 131, a straw 132, and a ball bearing 133.

The bladder 131 is a hollow fluid impermeable structure. The bladder 131 receives and stores the water 194 consumed by the companion animal 193. The bladder 131 inserts into and is stored within the sleeve 121 of the housing 102. The bladder 131 is a refillable structure such that any water 194 consumed by the companion animal 193 can be replenished. Methods to form a refillable bladder 131 are well-known and documented in the mechanical arts.

The straw 132 is a hollow tubular structure. The straw 132 attaches to the bladder 131 in the manner of a cantilever. The straw 132 inserts through the tube aperture 124 of the sleeve 121 such that the discharge port 136 is accessible to the companion animal 193. The straw 132 forms a fluidic connection with the bladder 131 such that the companion animal 193 can receive water 194 from the bladder 131 through the discharge port 136 of the straw 132. The straw 132 further comprises a rim 134, an intake port 135, and a discharge port 136.

The intake port 135 is the open end of the straw 132. The intake port 135 forms the fluidic connection between the straw 132 and the bladder 131. The intake port 135 is the fixed end of the cantilever structure formed by the straw 132. The discharge port 136 is the open end of the straw 132 that is distal from the intake port 135. The discharge port 136 is the free end of the cantilever structure formed by the straw 132. The discharge port 136 is the end of the straw 132 that inserts through the sleeve 121.

The ball bearing 133 is a spherical structure that inserts into the straw 132. The ball bearing 133 controls the flow of water 194 through the straw 132. The water 194 pressure within the bladder 131 and the straw 132 presses the ball bearing 133 against the rim 134 formed at the discharge port 136 of the straw 132. When the ball bearing 133 presses against the rim 134, the ball bearing 133 forms a seal that prevents water 194 from leaking out of the straw 132. The rim 134 is a circular structure that mounts over the discharge port 136 of the straw 132. The rim 134 has the shape of a ring. The rim 134 forms a throttle that limits the flow of water 194 through the discharge port 136. When the companion animal 193 presses its tongue against the ball bearing 133, a passage is opened through the throttle formed by the rim 134, which provides the companion animal 193 access to the water 194.

The tray 122 is a disk-shaped structure. The tray 122 removably attaches to the closed end of the pan structure of the sleeve 121. The tray 122 forms a horizontally oriented containment structure that captures water 194 that is spilled by the companion animal 193 when using the invention 100.

The following five paragraphs describe the assembly of the invention 100.

The first male component 181 of the first quick release buckle 151 attaches to the first end 201 of the first strap 141. The second male component 182 of the second quick release buckle attaches to the second end 202 of the first strap 141. The third male component 183 of the third quick release buckle 153 attaches to the third end 203 of the second strap 142. The fourth male component 184 of the fourth quick release buckle 154 attaches to the fourth end 204 of the second strap 142.

The first female component 171 of the first quick release buckle 151 attaches to the fifth end 205 of the third strap 143. The second female component 172 of the second quick release buckle 152 attaches to the eighth end 208 of the fourth strap 144. The third female component 173 of the third quick release buckle 153 attaches to the ninth end 209 of the fifth strap 145. The fourth female component 174 of the fourth quick release buckle 154 attaches to the twelfth end 212 of the sixth strap 146.

The first ring and slider arrangement 161 attaches to the first male component 181 and the first strap 141 such that the first ring and slider arrangement 161 adjusts the span of the length of the first strap 141. The second ring and slider arrangement 162 attaches to the third male component 183 and the second strap 142 such that the second ring and slider arrangement 162 adjusts the span of the length of the second strap 142.

The sixth end 206 of the third strap 143 attaches to the sleeve 121 of the housing 102. The seventh end 207 of the fourth strap 144 attaches to the sleeve 121 of the housing 102. The tenth end 210 of the fifth strap 145 attaches to the sleeve 121 of the housing 102. The eleventh end 211 of the sixth strap 146 attaches to the sleeve 121 of the housing 102.

The harness 101 attaches the housing 102 to the passenger seat 192 of the vehicle 191 by: a) wrapping the first strap 141 around the passenger seat 192 and using the first quick release buckle 151 and the second quick release buckle 152 to attach the first strap 141 to both the third strap 143 and the fourth strap 144; and, b) wrapping the second strap 142 around the passenger seat 192 and using the third quick release buckle 153 and the fourth quick release buckle 154 to attach the second strap 142 to both the fifth strap 145 and the sixth strap 146.

The following definitions were used in this disclosure:

Automobile: As used in this disclosure, an automobile is a road vehicle that specializes in carrying passengers and light cargo loads. This definition is specifically intended to include vehicles generally referred to as pickup trucks, vans, minivans, and sport utility vehicles. The automobile further comprises an electrical system. The automobile is further defined with a hood panel and a roof panel. The automobile is often defined with a trunk panel.

Ball Bearing: As used in this disclosure, a ball bearing is a spherical structure. One of the uses of ball bearings is to form the rotating structure of rolling element bearings.

Bladder: As used in this disclosure, a bladder is fluid impermeable structure. The internal volume of the structure can be varied by: a) varying the pressure and/or quantity of a fluid contained within the bladder; or b) varying the quantity of a liquid contained within the bladder. Bladders are commonly used for storage of a fluid and as a cushion.

Bottle: As used in this disclosure, a bottle is a container used for the storage of fluids. Access to the interior of a bottle is gained through the neck of the bottle. The neck is an elongated tube that forms an aperture through which fluids can be introduced and removed from the bottle.

Buckle: As used in this disclosure, a buckle is a fastening device that is used for joining a first loose end of a strap to a second loose end of the same strap or a different strap. A buckle further comprises a male connector that is attached to a first loose end and a female connector that is attached to a second loose end. The male connector has a pin or other structure that is generally caught by a structure formed in the female connector.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Companion Animal: As used in this disclosure, a companion animal is a domesticated animal that is maintained primarily for companionship. A companion animal is often referred to as a pet.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Liquid: As used in this disclosure, a liquid refers to a state (phase) of matter that is fluid and that maintains, for a given pressure, a fixed volume that is independent of the volume of the container.

Harness: As used in this disclosure, a harness is an apparatus comprising a plurality of straps and one or more fasteners that is used to fasten or anchor a first person or first object to a second object. The phrase N point harness refers to the installation of the harness wherein the harness has N anchor points. For example, a 2 point harness has two anchor points while a 5 point harness has five anchor points.

Housing: As used in this disclosure, a housing is a rigid casing that encloses and protects one or more devices.

Liquid: As used in this disclosure, a liquid refers to a state (phase) of matter that is fluid and that maintains, for a given pressure, a fixed volume that is independent of the volume of the container.

Livestock: As used in this disclosure, livestock refers to one or more animals that are maintained as the property of an agricultural operation.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rim: As used in this disclosure, a rim is a border that follows along the perimeter of an object.

Ring: As used in this disclosure, a ring is a term that is used to describe a disk-like structure through which an aperture is formed. Rings are often considered loops.

Ring and Slider Arrangement: As used in this disclosure, a ring and slider arrangement is an apparatus comprising a ring component and a slider component that is used to adjust the effective length of a webbing in an application. In the ring and slider arrangement, an end of the webbing is inserted through the slider component, looped through the ring component and then reverse threaded through the slider component for a second time. By adjusting the position of the slider component relative to the webbing, the effective length of the webbing can be adjusted. Ring and slider arrangements are well known and documented in the textile arts.

Sheeting: As used in this disclosure, a sheeting is a material, such as a paper, textile, a plastic, or a metal foil, in the form of a thin flexible layer or layers.

Sipper Water Bottle: As used in this disclosure, a sipper water bottle is a gravity powered watering device for livestock or a companion animal. The sipper water bottle comprises a bottle, a tube, and a ball bearing. The bottle is a gas impermeable structure that contains a fluid such as water. The tube attaches to the bottle in the manner of a cantilever. The tube is positioned relative to the bottle such that gravity feeds the water in the bottle into the tube. The ball bearing is put in the tube such that the ball bearing can roll to the free end of the tube. The ball bearing is held in position in the tube by a rim. The rim forms a throttle that keeps the ball bearing in the tube such that the ball bearing prevents water from flowing through the tube. The livestock or companion animal gains access to the water in the bottle by pressing their tongue against the ball bearing thereby pushing the ball bearing away from the throttle formed by the rim.

Sleeve: As used in this disclosure, a sleeve is a tube-like covering that is placed over an object.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Textile: As used in this disclosure, a textile is a material that is woven, knitted, braided or felted. Synonyms in common usage for this definition include fabric and cloth.

Throttle: As used in this disclosure, a throttle is a generic term for a device that controls the volume of flow into a structure.

Tray: As used in this disclosure, a tray is a disk-shaped pan structure that has a raised rim formed around the perimeter for the purpose of containing fluids within the structure of the tray. Trays will generally give an impression of being a shallow containment device. Trays are often used for carrying food and drink or for holding small items.

Tube: As used in this disclosure, a tube is a hollow prism-shaped device formed with two open ends. The tube is used for transporting liquids and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Vehicle: As used in this disclosure, a vehicle is a motorized device used for transporting passengers, goods, or equipment. The term motorized vehicle refers to a vehicle can move under power provided by an electric motor or an internal combustion engine.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The two surfaces of a webbing with the greatest surface area are called the faces of the webbing.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mechanical watering device comprising:
a harness, a housing, and a sipper water structure;
wherein the harness attaches to the housing;
wherein the housing contains the sipper water structure;
wherein the sipper water structure dispenses the water to the companion animal;
wherein the mechanical watering device is configured for use with a companion animal;
wherein the mechanical watering device is configured for use in a vehicle;
wherein the vehicle further comprises a passenger seat;
wherein the mechanical watering device provides a source of water for the companion animal as the companion animal is traveling in the vehicle;
wherein the companion animal controls when the water is dispensed;
wherein the harness comprises a plurality of straps, a plurality of buckles, and a plurality of ring and slider arrangements;
wherein the plurality of straps comprises a first strap, a second strap, a third strap, a fourth strap, a fifth strap, and a sixth strap;
wherein the housing comprises a sleeve and a tray;
wherein the tray removably attaches to the sleeve;
wherein the sleeve contains the sipper water structure;
wherein the sleeve has a pan structure;
wherein the sleeve is sized to receive and store the sipper water structure.

2. The mechanical watering device according to claim 1
wherein the harness is a textile-based apparatus;
wherein the harness attaches the housing to the passenger seat of the vehicle.

3. The mechanical watering device according to claim 2
wherein the harness is an adjustable structure;
wherein the harness accommodates variations in a form factor of the passenger seat of the vehicle.

4. The mechanical watering device according to claim 3
wherein each of the plurality of straps is a textile webbing;
wherein each of the plurality of buckles is a quick release buckle;
wherein each of the plurality of ring and slider arrangements is associated with a strap selected from the plurality of straps;
wherein each of the plurality of ring and slider arrangements attaches to the associated strap such that the selected ring and slider arrangement adjusts the span of the length of the selected strap.

5. The mechanical watering device according to claim 4
wherein each of the plurality of buckles attaches two straps selected from the plurality of straps together;
wherein each of the plurality of straps performs a function selected from the group consisting of: a) attaching two straps selected from the plurality of straps together; and, b) attaching a strap selected from the plurality of straps to the housing.

6. The mechanical watering device according to claim 5
wherein the first strap is a textile webbing structure;
wherein the second strap is a textile webbing structure;
wherein the third strap is a textile webbing structure;
wherein the fourth strap is a textile webbing structure;
wherein the fifth strap is a textile webbing structure;
wherein the sixth strap is a textile webbing structure.

7. The mechanical watering device according to claim 6
wherein the first strap attaches the third strap to the fourth strap;
wherein the second strap attaches the fifth strap to the sixth strap;
wherein the third strap attaches the first strap to the housing;
wherein the fourth strap attaches the first strap to the housing;
wherein the fifth attaches the second strap to the housing;
wherein the sixth strap attaches the second strap to the housing;
wherein the first strap is further defined with a first end and a second end;
wherein the second strap is further defined with a third end and a fourth end;

wherein the third strap is further defined with a fifth end and a sixth end;

wherein the fourth strap is further defined with a seventh end and an eighth end;

wherein the fifth strap is further defined with a ninth end and a tenth end;

wherein the sixth strap is further defined with an eleventh end and a twelfth end.

8. The mechanical watering device according to claim 7 wherein the plurality of buckles comprises a first quick release buckle, a second quick release buckle, a third quick release buckle, and a fourth quick release buckle;

wherein the first quick release buckle is the quick release buckle that attaches the first strap to the third strap;

wherein the second quick release buckle is the quick release buckle that attaches the first strap to the fourth strap;

wherein the third quick release buckle is the quick release buckle that attaches the second strap to the fifth strap;

wherein the fourth quick release buckle is the quick release buckle that attaches the second strap to the sixth strap.

9. The mechanical watering device according to claim 8 wherein the first quick release buckle comprises a first female component and a first male component;

wherein the first male component inserts into the first female component;

wherein the first female component is the female component of the first quick release buckle;

wherein the first male component is the male component of the first quick release buckle;

wherein the second quick release buckle comprises a second female component and a second male component;

wherein the second male component inserts into the second female component;

wherein the second female component is the female component of the second quick release buckle;

wherein the second male component is the male component of the second quick release buckle;

wherein the third quick release buckle comprises a third female component and a third male component;

wherein the third male component inserts into the third female component;

wherein the third female component is the female component of the third quick release buckle;

wherein the third male component is the male component of the third quick release buckle;

wherein the fourth quick release buckle comprises a fourth female component and a fourth male component;

wherein the fourth male component inserts into the fourth female component;

wherein the fourth female component is the female component of the fourth quick release buckle;

wherein the fourth male component is the male component of the fourth quick release buckle.

10. The mechanical watering device according to claim 9 wherein the plurality of ring and slider arrangements comprises a first ring and slider arrangement and a second ring and slider arrangement;

wherein the first ring and slider arrangement is a ring and slider arrangement used to tighten the first strap to the passenger seat of the vehicle;

wherein the second ring and slider arrangement is a ring and slider arrangement used to tighten the second strap to the passenger seat of the vehicle.

11. The mechanical watering device according to claim 10 wherein the sleeve further comprises a prism structure and a tube aperture;

wherein the prism structure is a hollow prism-shaped container that forms the pan structure of the sleeve;

wherein the prism structure forms the exterior surface of the sleeve;

wherein the tube aperture is an aperture that is formed through the sleeve.

12. The mechanical watering device according to claim 11 wherein the sipper water structure comprises a bladder, a straw, and a ball bearing;

wherein the bladder is a hollow fluid impermeable structure;

wherein the straw is a hollow tubular structure;

wherein the straw attaches to the bladder in the manner of a cantilever;

wherein the ball bearing is a spherical structure that inserts into the straw;

wherein the tube aperture is sized to receive the straw of the sipper water structure such that the straw is accessible to the companion animal;

wherein the ball bearing controls the flow of water through the straw.

13. The mechanical watering device according to claim 12 wherein the bladder receives and stores the water consumed by the companion animal;

wherein the bladder inserts into and is stored within the sleeve of the housing;

wherein the bladder is a refillable structure.

14. The mechanical watering device according to claim 13 wherein the straw further comprises a rim, an intake port, and a discharge port;

wherein the intake port is an open end of the straw;

wherein the intake port forms the fluidic connection between the straw and the bladder;

wherein the intake port is the fixed end of the cantilever structure formed by the straw;

wherein the discharge port is an open end of the straw that is distal from the intake port;

wherein the discharge port is the free end of the cantilever structure formed by the straw;

wherein the discharge port is the end of the straw that inserts through the sleeve;

wherein the rim is a circular structure that mounts over the discharge port of the straw.

15. The mechanical watering device according to claim 14 wherein the straw forms a fluidic connection with the bladder such that the companion animal can receive water from the bladder through the discharge port of the straw;

wherein the water pressure within the bladder and the straw presses against the rim formed at the discharge port of the straw;

wherein when the ball bearing presses against the rim, the ball bearing forms a seal that prevents water from leaking out of the straw.

16. The mechanical watering device according to claim 15 wherein the rim has the shape of a ring;

wherein the rim forms a throttle that limits the flow of water through the discharge port.

17. The mechanical watering device according to claim 16 wherein the tray is a disk-shaped structure;

wherein the tray removably attaches to the closed end of the pan structure of the sleeve;

wherein the tray forms a horizontally oriented containment structure.

18. The mechanical watering device according to claim 17 wherein the first male component of the first quick release buckle attaches to the first end of the first strap;

wherein the second male component of the second quick release buckle attaches to the second end of the first strap;

wherein the third male component of the third quick release buckle attaches to the third end of the second strap;

wherein the fourth male component of the fourth quick release buckle attaches to the fourth end of the second strap;

wherein the first female component of the first quick release buckle attaches to the fifth end of the third strap;

wherein the second female component of the second quick release buckle attaches to the eighth end of the fourth strap;

wherein the third female component of the third quick release buckle attaches to the ninth end of the fifth strap;

wherein the fourth female component of the fourth quick release buckle attaches to the twelfth end of the sixth strap;

wherein the first ring and slider arrangement attaches to the first male component and the first strap such that the first ring and slider arrangement adjusts the span of the length of the first strap;

wherein the second ring and slider arrangement attaches to the third male component and the second strap such that the second ring and slider arrangement adjusts the span of the length of the second strap;

wherein the sixth end of the third strap attaches to the sleeve of the housing;

wherein the seventh end of the fourth strap attaches to the sleeve of the housing;

wherein the tenth end of the fifth strap attaches to the sleeve of the housing;

wherein the eleventh end of the sixth strap attaches to the sleeve of the housing;

wherein the harness attaches the housing to the passenger seat of the vehicle by: a) wrapping the first strap around the passenger seat and using the first quick release buckle and the second quick release buckle to attach the first strap to both the third strap and the fourth strap; and, b) wrapping the second strap around the passenger seat and using the third quick release buckle and the fourth quick release buckle to attach the second strap to both the fifth strap and the sixth strap.

\* \* \* \* \*